(12) United States Patent
Richardson (10) Patent No.: US 7,453,987 B1
(45) Date of Patent: Nov. 18, 2008

(54) METHOD AND SYSTEM FOR HIGH ENERGY, LOW RADIATION POWER X-RAY IMAGING OF THE CONTENTS OF A TARGET

(75) Inventor: Rex D Richardson, Poway, CA (US)

(73) Assignee: Science Applications International Corporation, San Diego, CA (US)

( * ) Notice: Subject to any disclaimer, the term of this patent is extended or adjusted under 35 U.S.C. 154(b) by 43 days.

(21) Appl. No.: 11/634,218

(22) Filed: Dec. 6, 2006

Related U.S. Application Data (63) Continuation of application No. 11/070,186, filed on Mar. 3, 2005.

(60) Provisional application No. 60/549,671, filed on Mar. 4, 2004.

(51) Int. Cl.
*G01N 23/10* (2006.01)

(52) U.S. Cl. ........................ 378/98.9; 378/57

(58) Field of Classification Search ............ 378/57, 378/98.9
See application file for complete search history.

(56) References Cited

U.S. PATENT DOCUMENTS

| | | | | |
|---|---|---|---|---|
| 3,984,332 | A | | 10/1976 | Nelson et al. ............... 250/368 |
| 4,115,696 | A | * | 9/1978 | Truscott ...................... 378/13 |
| 4,179,100 | A | * | 12/1979 | Sashin et al. ........... 250/370.09 |
| 4,502,147 | A | * | 2/1985 | Michaels .................... 378/206 |
| 4,649,276 | A | * | 3/1987 | Suzuki .................. 250/370.11 |
| 4,651,005 | A | | 3/1987 | Baba et al. ............... 250/360.1 |
| 4,857,748 | A | * | 8/1989 | Takiguchi .............. 250/559.21 |
| 5,115,394 | A | * | 5/1992 | Walters ...................... 382/131 |
| 5,218,533 | A | * | 6/1993 | Schanen ....................... 378/9 |
| 5,287,396 | A | * | 2/1994 | Stegehuis ................. 378/98.2 |
| 5,661,774 | A | | 8/1997 | Gordon et al. ............. 378/101 |
| 5,706,326 | A | * | 1/1998 | Gard ........................... 378/19 |
| 5,838,759 | A | * | 11/1998 | Armistead ................... 378/57 |
| 6,094,468 | A | * | 7/2000 | Wilting et al. ................ 378/8 |
| 6,122,344 | A | | 9/2000 | Beevor ....................... 378/88 |
| 6,188,473 | B1 | | 2/2001 | Leistner et al. ............ 356/213 |
| 6,255,654 | B1 | | 7/2001 | Verbinski et al. ......... 250/358.1 |
| 6,320,193 | B1 | * | 11/2001 | Morrison et al. ........... 250/393 |
| 6,362,479 | B1 | | 3/2002 | Andreaco et al. .......... 250/366 |
| 6,385,288 | B1 | * | 5/2002 | Kanematsu .................. 378/65 |
| 6,473,487 | B1 | * | 10/2002 | Le ............................. 378/57 |

(Continued)

OTHER PUBLICATIONS

Jelley, "Cerenkov Radiation and Its Applications", Pergamon Press, New York, 1958.*

(Continued)

*Primary Examiner*—Chih-Cheng G Kao
(74) *Attorney, Agent, or Firm*—King & Spalding LLP (57) ABSTRACT

The systems and methods described herein automatically detect, highlight and identify high-Z materials in volume concentrations of approximately 100 $cm^3$ or greater utilizing single and/or dual energy sources with x-ray and neutron detectors. The methods and systems described herein are applied to the imaging of containerized cargo and cargo vehicles. Pursuant to the described systems and methods, radiation powers are orders of magnitude lower than those used in the conventional systems. By reducing the radiation power by a factor of, for example, 100 or more, the shielding requirements for the system are greatly reduced, alignment requirements can be significantly relaxed and system components can be lighter weight and more modular. Consequently, system costs are reduced.

54 Claims, 6 Drawing Sheets

U.S. PATENT DOCUMENTS

| | | | |
|---|---|---|---|
| 6,507,025 B1 | 1/2003 | Verbinski et al. | 250/358.1 |
| 6,507,642 B2* | 1/2003 | Fujishige et al. | 378/151 |
| 6,552,346 B2 | 4/2003 | Verbinski et al. | 250/358.1 |
| 6,552,347 B1 | 4/2003 | Dimcovski | 250/363.01 |
| 6,621,891 B2* | 9/2003 | Danielsson | 378/150 |
| 6,661,867 B2 | 12/2003 | Mario et al. | 378/57 |
| 2002/0070365 A1 | 6/2002 | Karellas | 250/581 |
| 2002/0090050 A1 | 7/2002 | Nutt et al. | 378/19 |
| 2002/0094064 A1* | 7/2002 | Zhou et al. | 378/122 |
| 2002/0136353 A1 | 9/2002 | Kang et al. | 378/57 |
| 2004/0109532 A1* | 6/2004 | Ford et al. | 378/57 |

OTHER PUBLICATIONS

Sukosd, Csaba, "Determination of Delayed Neutron Parameters and of Uranium Content of a Sample" [online], [retrieved on Sep. 1, 2005], 17 pp., Retrieved from the Internet: http://wwwreak.bme.hu/nti/Education/Wigner_Course/WignerManuals/Budapest/DELAYED_NEUTRON.htm.

J. C. David, et al., "Mass and Charge Distributions From Photon-Induced Fission: Comparison With Experimental Data and Yields From Neutron Induced-Fission" [online], [retrieved on Sep. 1, 2005], 9 pp., Retrieved from the Internet: http://www-dapnia.cea.fr/Doc/Publications/Archives/dapnia-03-430.pdf.

Proposal No. 01-1769-71-2005-002, "VACIS-Z Upgrade for Photofission Detection of SNM," vols. I and II, Submitted To: Department of Homeland Security, Homeland Security Advanced Research Projects Agency (HSARPA), In Response To: Department of Homeland Security, Homeland Security Advanced Research Projects Agency (HSARPA), Part A, Technical Topic Area (TTA) 6—Detection Systems for Radiological and Nuclear Countermeasure (DSRNC) Broad Agency Announcement 04-02 (BBA 04-02), Submitted By: Science Applications International Corporation, 35 pp., Jul. 7, 2004.

"Non-Instrusive, High-Energy X-Ray Inspection System for Detection of WMD in Fully Laden Tanker Trucks and Cargo Containers," A Report Submitted in Response To: Request for Information By: DHS—Border and Transportation Security, United States Customs Service, Procurement Division, Classification Code: 58—Communications, Detection & Coherent Radiation Equipment, Solicitation No. YY, Submitted To: Aaron Ford, Contracting Officer, United States Customs Service Procurement Division, Submitted By: Science Applications International Corporation, 7 pp., Nov. 3, 2003.

"VACIS-Z: A Dual-Energy X-Ray Imager for High-Z Materials Detection," A Phase III Proposal Submitted in Response TO: BAA Announcement No. DAAD05-03-T-0024, Submitted To: Combating Terrosim Technology Support Office, Technical Support Working Group, Submitted By: Science Applications International Corporation, 51 pp, Oct. 3, 2003.

"VACIS-Z: A Dual-Energy X-Ray Imager for High-Z Material Detection," A Phase II White Paper Submitted in Response To: BAA Announcement No. DAAD05-03-T-0024, Submitted To: Combating Terrorism Technology Support Office, Technical Support Working Group, Submitted By: Science Applications International Corporation, 13 pp., Aug. 13, 2003.

BAA No. TSWG DAAD05-04-T-0024 DHS, Missing Area: 5.1 Chemical, Biological, Radiological and Nuclear Countermeasures (CBRNC), Requirement No. 1072 / CB-1072-SAIC-1769-1, Proposal Title: "VACIS-Z: A Dual-Energy Betatron Imager for High Z Materials Detection," 1 p., Jun. 10, 2003.

White Paper for the Development of a "Low Cost, Relocatable, High Energy (7.5 MeV) X-Ray Cargo Imaging System for Detection of WMD," Submitted To: Department of Homeland Security, U.S. Bureau of Customs and Border Protection (CBP), Submitted By: Science Applications International Corporation, 6 pp., May 5, 2003.

J. L. Jones, et al., "Photonuclear Based Detection of Nuclear Smuggling in Cargo Containers," $17^{th}$ International Conference on Application of Accelerators in Research and Industry, Denton, Texas, 4 pp., Nov. 12-16, 2002.

C. E. Moss, et al., "Linear Accelerator-Based Active Interrogation of Detection of Highly Enriched Uranium" $17^{th}$ International Conference on Application of Accelerators in Research and Industry, Denton, Texas, 5 pp., Nov. 12-16, 2002.

S. Ogorodnikov and V. Petrunin, "Process of Interlaced Images in 4-10 MeV Dual Energy Custons System for Material Recognition," Physical Review Special Topics—Accelerators and Beams, vol. 5, pp. 104701-1-104701-11, 2002.

G. F. Knoll, "Radiation Detection and Measurement," John Wiley, Inc., New York, pp. 711-713, 9 pp., 2000.

M. F. Vorogushin, et al., "Experiments on Material Recognition for 8 MeV Customs Inspection System for Trucks and Large-Scale Containers," XX International Linac Conference, Monterey, California, 2000.

V. L. Novikov, et al., "Dual Energy Method of Material Recognition in High-Energy Introscopy Systems," XVI International Workshop on Charged Particle Linear Accelerators, Alushta, Crimea, Ukraine, 2 pp., Sep. 6-12, 1999.

V. L. Novikov, et al., "Dual Energy Method of Material Recognition in High Energy Introscopy Systems," Proc. $16^{th}$ International Workshop on Charged Particle Linear Accelerators, Alushta, Crimea, Ukraine, 1999, appeared in ISSN 1562-6016, Problems of Atomic Science and Technology, vol. 4, p. 93, 1999.

Fetter, Steve, et al., "Detecting Nuclear Warheads," Science & Global Security, vol. 1, pp. 225-253, 1990.

Fetter, Steve, et al., "Appendix A—Fissile Materials and Weapon Design," Science & Global Security, vol. 1, pp. 255-263, 1990.

Fetter, Steve, et al., "Appendix B—Emission and Absorption of Radiation" Science & Global Security, vol. 1, pp. 265-285, 1990.

Mozley, Robert, "Appendix C—Particle Sources and Radiography," Science & Global Security, vol. 1, pp. 287-302, 1990.

"Handbook on Nuclear Activation Cross Sections," International Atomic Energy Agency, Technical Reports Series 156, p. 552, Vienna, 1974.

J. V. Kelly, "Cherenko Radiation and Its Applications," Pergamon Press, New York, 1958.

U.S. Appl. No. 11/070,186, Letter Restaring Period for Response/Final Rejection, Mar. 17, 2008.

U.S. Appl. No. 11/070,186, Final Rejection, Feb. 26, 2008.

U.S. Appl. No. 11/070,186, Response to Non-Final Rejection, Nov. 26, 2007.

U.S. Appl. No. 11/070,186, Non-Final Rejection, Jul. 27, 2007.

U.S. Appl. No. 11/070,186, Reponse to Non-Final Rejection, May 20, 2007.

U.S. Appl. No. 11/070,186, Non-Final Rejection, Apr. 10, 2007.

U.S. Appl. No. 11/070,186, Utility Filing, Mar. 3, 2005.

* cited by examiner

Figure 4
Top View

Figure 5
Top View

Figure 6
Top View

METHOD AND SYSTEM FOR HIGH ENERGY, LOW RADIATION POWER X-RAY IMAGING OF THE CONTENTS OF A TARGET

CROSS-REFERENCE TO RELATED APPLICATIONS

The current application is a continuation of and claims the benefit of priority of U.S. patent application Ser. No. 11/070,186, filed Mar. 3, 2005 entitled METHOD AND SYSTEM FOR HIGH ENERGY, LOW RADIATION POWER X-RAY IMAGING OF THE CONTENTS OF A TARGET, which claims priority to U.S. Provisional Patent Application Ser. No. 60/549,671 filed Mar. 4, 2004 entitled METHOD AND SYSTEM FOR DUAL-ENERGY IMAGING OF THE CONTENTS OF A TARGET, which are incorporated herein by reference in their entirety.

The U.S. Government may have a paid-up license in this invention and may have the right in limited circumstances to require the patent owner to license others on reasonable terms as provided for by the terms of contract No. N41756-04-C-4200 awarded by the Technical Support Working Group (TSWG), funded by the Department of Homeland Security.

BACKGROUND OF THE INVENTION

1. Field of the Invention

The invention relates generally to non-intrusive cargo and vehicular inspection using radioscopic imaging. More particularly, the invention describes a method for low radiation power imaging using high energy x-rays and system for dual-energy imaging and/or dual mode detection of the contents of a target taking advantage of the techniques developed for low radiation power imaging.

2. Description of the Related Art

Conventional high energy (>4 MeV) x-ray imaging inspection systems all use some type of low duty cycle pulsed electron beam x-ray source such as a radio frequency (RF) linear accelerator (linac) or pulsed inductive accelerator such as a betatron. These systems also all use some form of an x-ray-to-visible or near visible light converter and integrating photodetector. These converters are typically dense scintillators such as cadmium tungstate ($CdWO_4$). The scintillator light is integrated by various methods to produce a single number representing all the detectable x-ray interactions in the scintillator material within a given x-ray pulse or train of pulses from the accelerator source. This is generally referred to in the art as the analog mode or the current mode of detection. In this mode single x-ray photons are not detected or discriminated by energy in any way and these types of analog or current mode solid state detectors cannot be converted to discrete photon counting operation. The main advantage of this approach is that individual detectors can be made very small and inexpensive per channel using solid state photodiodes and direct-mount circuit board packaging. This allows high spatial resolution systems, some resolving features as small as 2 mm, to be constructed. The disadvantage of this approach is that the radiation power needed to achieve good image quality is typically 1-10 gray per minute (Gy/min) measured at one meter from the x-ray source. Very heavy shielding, support, and alignment structures, resulting in greater overall system cost, are therefore required.

A second type of inspection system, developed by the assignee of the current application, utilizes a discrete photon counting approach with at least one source. Representative embodiments of previously developed discrete photon systems and methods are described in at least U.S. Pat. No. 6,507,025 for DENSITY DETECTION USING REAL TIME DISCRETE PHOTON COUNTING FOR FAST MOVING TARGETS; U.S. patent application Ser. Nos. 09/925,009, for DENSITY DETECTION USING REAL TIME DISCRETE PHOTON COUNTING FOR FAST MOVING TARGETS, filed Aug. 9, 2001; 10/717,632 for DENSITY DETECTION USING REAL TIME DISCRETE PHOTON COUNTING FOR FAST MOVING TARGETS, filed Nov. 21, 2003; 10/767,723 entitled METHOD AND SYSTEM FOR AUTOMATICALLY SCANNING AND IMAGING THE CONTENTS OF A MOVING TARGET, filed Jan. 30, 2004; 10/833,131 for DENSITY DETECTION USING REAL TIME DISCRETE PHOTON COUNTING FOR FAST MOVING TARGETS, filed Apr. 28, 2004; and 10/856,942 entitled TARGET DENSITY IMAGING USING DISCRETE PHOTON COUNTING TO PRODUCE HIGH-RESOLUTION RADIOGRAPHIC IMAGES, filed Jun. 1, 2004, which are incorporated by reference herein.

SUMMARY OF THE INVENTION

Summary of the Problem

There is an increasing need in the art to improve cargo imaging systems in order to provide affordable and enhanced detection of illegal and harmful objects and/or substances. Most importantly there is a need to develop a domestic system to detect and report any attempt to import or transport a nuclear explosive device, fissile material, or radiological material intended for illicit use. Previously reported high energy cargo imaging systems and methods do not provide the type of photon energy discrimination that is necessary to reduce system cost, maximize imaging performance, and provide material discrimination capabilities. Known systems and methods integrate all photon flux interacting in the scintillator which results in three important limitations.

First, known systems have no capability to reject off-axis radiation resulting from target scattering other than by the use of expensive and ineffective collimating structures. The limited ability of previous systems and methods to reject scattered, off-axis radiation ultimately limits target penetration regardless of the available radiation power. Consequently, there is a need in the art for a system and method that is able to better reject off-axis radiation due to scattering, in order to improve imaging capabilities and identify and differentiate between objects of interest within the target being imaged.

Second, known systems have no method for individual x-ray photon detection. Ultimate penetration in cargo, or the penetration limit at which a dense target such as a large mass of steel or lead can be resolved against the background, is determined by the noise levels in the analog electronics in addition to the scattered radiation components. Hundreds or thousands of x-ray photon interactions in the scintillator per accelerator pulse are required to generate an analog signal above the noise level. Using discrete photon detection, useful signals are obtained at about one photon per accelerator pulse. Hence the radiation power in a photon counting system can be reduced by a factor of 100 or more while retaining equivalent or greater penetration performance.

Third, known systems have no method for counting transmitted x-ray photons according to the photon energy. This method requires that each photon pulse height be compared to at least one set discriminator level in the processing electronics. Furthermore, due to the low duty cycle nature of the pulsed x-ray sources the x-ray photons arrive in short bursts at very high rates. High rates require extremely fast detectors and electronics. The slow scintillators, photodiodes, and integrating electronics of known systems are completely incompatible with the high speed response requirements. There is a need for a high speed photon counting system with energy discrimination to overcome the first two limitations described above and enable special processing based on high energy photon transmission characteristics. This special processing will enhance the sensitivity of dual energy imaging detection methods especially for high atomic number materials such as special nuclear materials (SNM).

Summary of the Solution

A first non-limiting embodiment of the present invention includes a system for cargo imaging including a radiation source with dual mode detection. The system includes: a radiation source configured to direct radiation at the target object; a first detector configured to detect radiation from the target object in an analog mode; a second detector configured to detect radiation from the target object in a discrete photon counting mode; and an image processor for imaging the target object in response to the detected radiation from the first and second detectors.

Further to the first non-limiting embodiment, the first and second detectors may be physically distinct devices or two channels, a discrete photon counting channel and an integration channel, derived from a single detector. The discrete photon counting channel can furthermore be divided electronically into an unlimited number of discriminator channels to enable finer pulse height resolution of the x-ray photon interaction events.

In a variation of the first non-limiting embodiment, the radiation source is operated alternately in a dual energy mode, at approximately 5.0 MeV to 6 MeV in a first energy mode and at approximately 8 to 10 MeV in a second energy mode. The term 'energy' applied to the x-ray source always refers to the peak energy of the electron beam in the accelerator. The electron beam is made to impinge on a solid target producing a broad spectrum of x-ray photons referred to as a bremsstrahlung spectrum. By application of thick filters, e.g. 10 cm of solid copper, in the beam path this spectrum can be biased substantially to the higher x-ray photon energies. Such so called 'radiation hardening' techniques are impractical in most known systems because of the requirement for large radiation powers in the inspection beam. The accelerator x-ray source would become extremely large and expensive if 90% or more of the radiation power was consumed by an aggressive, spectrum hardening filter. The present invention embodied in the capability to operate at scanning beam radiation powers down to 0.01 Gy/min at one meter from the x-ray source allows the use of conventional linac x-ray sources with spectral hardening filters that reduce the radiation power by more than a factor of 100. A hardened radiation spectrum at both energies can substantially improve the sensitivity of the dual energy mode to the presence of high atomic number materials.

A second non-limiting embodiment of the present invention includes a system for general cargo imaging using any type of pulsed or continuous wave source. The system includes: a radiation source configured to direct radiation at the target object; a detector system configured to detect at least part of the radiation directed at and transmitted through the target object and producing signals representative of photons comprising the radiation, the detector system includes at least one non-scintillation radiation converter that converts x-ray photons to visible and near visible light pulses; and an electronics system configured to perform one of (i) discretely counting x-ray photons as represented by the converter light pulses and (ii) integrating the converter interaction events based on the signals representative thereof.

A third non-limiting embodiment of the present invention includes a method for determining the presence of a high atomic number material within a target object. The method comprises: alternately directing radiation having a first approximate energy and radiation having a second approximate energy at the target object; detecting at least part of the radiation directed at and transmitted through the target, wherein detecting at least part of the radiation comprises (i) converting the radiation into visible and near visible light pulses via a non-scintillation radiation converter and (ii) producing signals representative of the converter light pulses; performing one of discretely counting individual x-ray photon interactions produced in the converter and integrating the interaction light pulses over many individual x-ray photon interaction events based on the signals representative thereof; constructing a radioscopic image element (usually a single pixel) of the target object either from the discretely counted x-ray photon events over a unit time or the integrated signal comprising all x-ray photon events over a unit time from radiation having the first approximate energy in a first image and from radiation having the second approximate energy in a second image; and comparing the first and second images to determine the presence of a high atomic number material.

DESCRIPTION OF THE INVENTION

The system and method of the present invention is intended to detect and highlight high-Z materials in volume concentrations of approximately 100 $cm^3$ or greater. The methods and systems described herein are applied to the imaging of containerized cargo and cargo vehicles, but one skilled in the art recognizes the numerous alternative applications for the methods and systems. In embodiments of the present system and method, the scanning x-ray beam radiation powers are orders of magnitude lower than those used in the conventional systems. By reducing the radiation power by a factor of, for example, 100 or more, the shielding requirements for the system are greatly reduced, alignment requirements can be significantly relaxed and system components can be lighter weight and more modular. Consequently, system costs are reduced. Furthermore low radiation powers allow use of aggressive, spectral hardening filters on conventional linac x-ray sources.

Figures 1A, 1B:
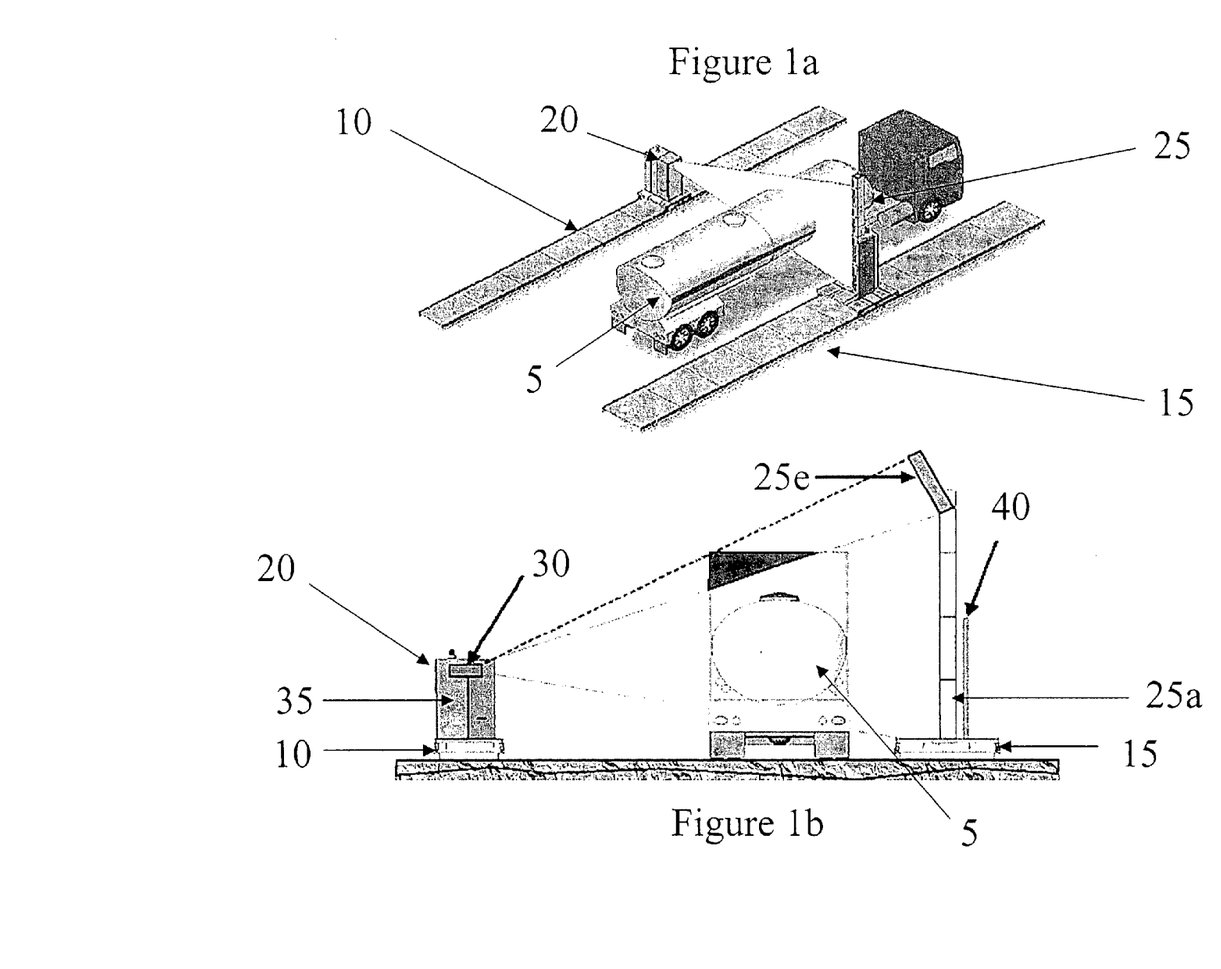
FIGS. 1(a) and 1(b) illustrate an exemplary imaging system according to an embodiment of the present invention.

In a first embodiment of the present invention, a relocatable dual track system is utilized as illustrated in FIGS. 1(a) and 1(b). FIG. 1(a) illustrates the basic system including a first track 10 for guiding a source 20 and a second track 15 for guiding detector component 25. The source 20 and detector component 25 are utilized in combination to image the contacts of the target 5 shown as a typical tanker truck form factor. In an alternative embodiment, the detector component 25 includes multiple detector panels 25a-X, e.g., 25a-e are shown in FIG. 1b, each of which is comprised of individual detectors, wherein detector panel 25e is angled so as to maximize detection of radiation passing through the target 5 where the target is a container cargo section as shown. With this configuration, the scan of each target is accomplished in less than 60 seconds, with throughput per hour of approximately 20-40 vehicles and scan speeds of approximately 8-12 inches per second.

Further to the first embodiment, source 20 is a betatron source emitting at approximately 5-7.5 MeV which includes a compact betatron x-ray head 30 replacing known isotopic source assemblies. Due to the simplicity and compactness of the betatron head 30, only about 4000 lbs of lead-equivalent shielding 35 is required around the source. A similar amount of shielding is also utilized on at least the lower portion of the detector tower 40. The exact amount of shielding is determined by the restricted zone requirements (i.e., available footprint) but this level of shielding will keep the width of the footprint to less than 60 ft. The betatron control module, also a very compact unit, fits into an electrical cabinet next to the source enclosure (not shown). The betatron source requires less than 2 kW of power. The betatron is air-cooled and operates over the temperature range of −20° C. to +40° C. at 100% duty cycle.

The individual detector characteristics comprising the detector component 25 may be selected depending upon the desired signal processing mode, spatial resolution, and contrast sensitivity. The x-ray converters may be comprised of non-scintillating materials, the preferred embodiment of the present invention, or of scintillator materials such as organic scintillators, single crystals of thallium-activated sodium iodide [commonly referred to as NaI(Tl)], single crystals of sodium-activated cesium iodide [CsI(Na)], or single crystals of bismuth germanate (BGO). Alternatively, 1⅛ inch square NaI-PMT detectors are suitable for use in comparable gamma-based products. Additional detector configuration details for gamma-based systems may be found in U.S. Pat. No. 6,507,025 and U.S. patent application Ser. Nos. 09/925,009, for DENSITY DETECTION USING REAL TIME DISCRETE PHOTON COUNTING FOR FAST MOVING TARGETS, filed Aug. 9, 2001; 10/717,632 for DENSITY DETECTION USING REAL TIME DISCRETE PHOTON COUNTING FOR FAST MOVING TARGETS, filed Nov. 21, 2003; 10/767,723 entitled METHOD AND SYSTEM FOR AUTOMATICALLY SCANNING AND IMAGING THE CONTENTS OF A MOVING TARGET, filed Jan. 30, 2004, and 10/856,942 entitled TARGET DENSITY IMAGING USING DISCRETE PHOTON COUNTING TO PRODUCE HIGH-RESOLUTION RADIOGRAPHIC IMAGES, filed Jun. 1, 2004, which are incorporated by reference herein.

The processing of the radiation detected by the individual detectors is achieved through a dual mode, analog/discrete photon counting data acquisition system. In a first implementation of the dual mode data acquisition system, for thin targets, e.g., less than three inches of steel, the x-ray pulses are converted to analog PMT currents, integrated, and then digitized. When the targets exceed this thickness of steel the mode will switch to discrete photon counting. A description of discrete photon counting is found in commonly owned U.S. Pat. No. 6,507,025, which is incorporated herein by reference. In a second implementation, both analog and photon counting data streams are captured in parallel and selective software is used to select the best data for construction of the final image of the target.

While the systems and methods described above are shown implemented through a dual track scanning system, one skilled in the art recognizes that the system may be implemented through a stationary portal or pallet system or alternatively through a mobile, vehicle based system utilizing a boom configuration or gantry-style configuration for placing the source in relation to the detectors. Further, the target may remain stationary, while the source and detector moves or the target may move, while the source and detector remain stationary.

In a second embodiment of the present invention, a system and method for imaging the contents of a target includes a dual-energy, dual-imaging technique for providing data that is used to differentiate high-Z (Z stands for the average atomic number of the material by weight) materials from the low and medium Z surrounding materials. The low and medium Z materials can also be differentiated, but with less sensitivity. High-Z materials are materials with a high atomic number such as those associated with weapons of mass destruction (WMDs), e.g., material such as uranium (Z=92) and plutonium (Z=94).

Referring again to FIG. 1a, an exemplary implementation of the system includes a first track 10 for guiding a source 20 and a second track 15 for guiding detector component 25. In this second embodiment of the present invention, the source 20 is a linear accelerator (linac) operating in an interlaced mode at 5-6 MeV and 8-10 MeV end point energies. For example, linear accelerators are available from Varian Medical Systems. In alternative embodiments, the radiation source is a betatron accelerator, available from JME Ltd. or any pulsed or continuous wave x-ray source. The preferred operating characteristics for the source 20 include low leakage (low external radiation exposure) targets having no more than 20 μSv/hr x-ray exposure and no more than 20 μSv/hr neutron exposure at one meter from the x-ray converter. These low levels of exposure are achieved by selective shielding provided by the x-ray source manufacturer or provided as part of the source enclosure shielding system. In an exemplary embodiment, the x-ray beam collimator is set for a beam fan angle of 26 degrees which is sufficient to image a cargo container of height up to 9'-6" mounted on a standard trailer chassis and for a source to detector distance of 10 meters. One skilled in the art recognizes that the collimator may be changed to accommodate targets of varying size. Additionally the source assembly may also include brackets as part of the source assembly to support additional beam filters and fan angle blocks as needed.

Further still, an exemplary implementation of this second embodiment may include an integrated laser alignment system as part of the source assembly to assist in source alignment during installation of the imaging system. An ion chamber directly in the beam path provides real time signals indicating the integrated radiation output for each of the x-ray pulses, nominally 2-5 μs in duration. In addition to being used for accelerator control, these signals may be digitized and used to correct the image pixel columns for pulse-to-pulse variations. The ion chamber signals also provide the data necessary to approximately balance the penetration for the dual energy mode.

Figure 2:
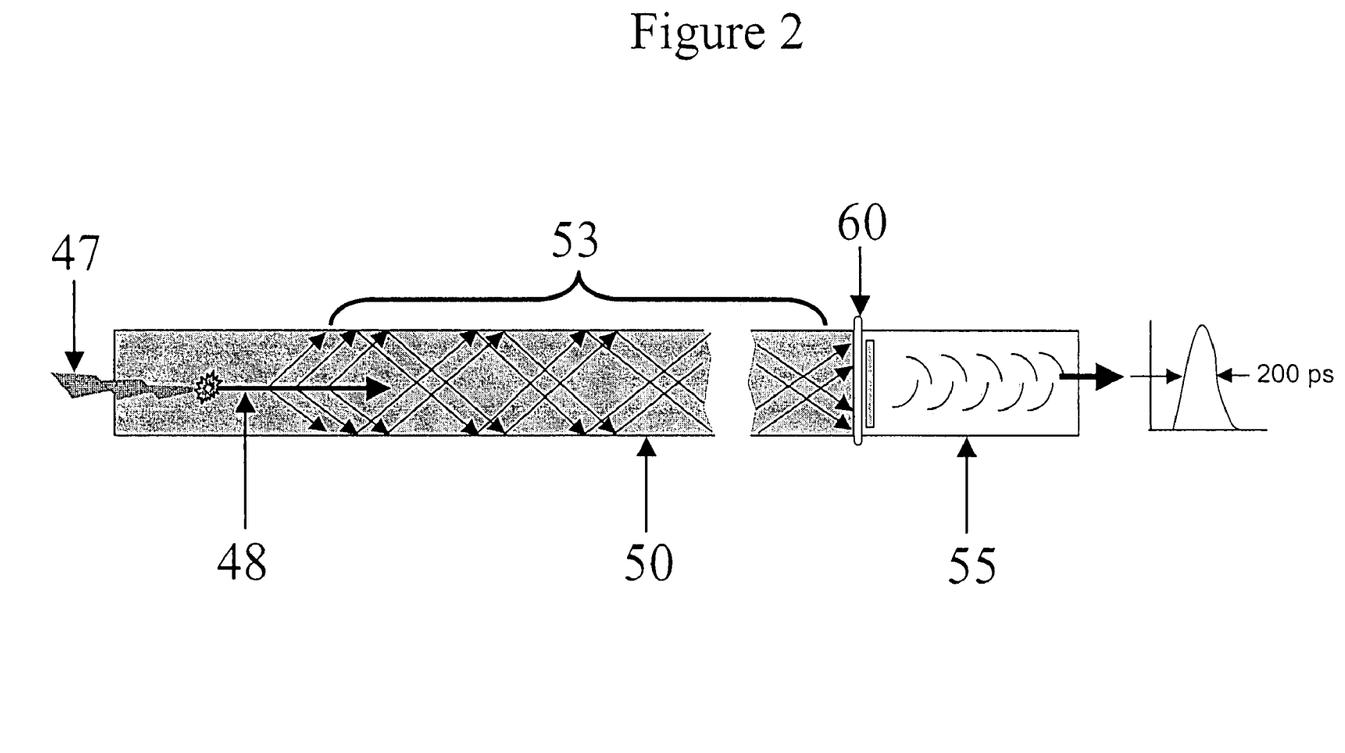
FIG. 2 illustrates an exemplary detection system according to an embodiment of the present invention.

A first exemplary detector component of the second embodiment is based on ultra-fast photon counting, x-ray energy discrimination, and rejection of low energy and scattered radiation. The detector component operates in the photon counting mode to achieve the same penetration as conventional high energy x-ray systems, but at average radiation powers that are approximately 100 times lower. Referring to FIG. 2, the detection system of the second embodiment of the present invention replaces the conventional scintillator within an individual detector with a Cherenkov x-ray converter 50, for example, a non-scintillating plastic or glass rod, and fast rise time photomultiplier tube (PMT) 55. Cherenkov radiation produces visible light pulses less than 300 picoseconds in duration from high energy x-rays 47 interacting with the converter material. Cherenkov radiation is emitted along Compton recoil electron or positron-electron pair tracks 48 as these particles slow down in the non-scintillating converter. The converters are highly efficient in light collection and transmission due to total internal reflection of the Cherenkov radiation 53, along the length of the converter and to the high optical transmission characteristics of the preferred materials. Fast rise time, e.g., 700 picosecond, photomultiplier tubes convert the light pulses into current pulses, i.e. signals, that are recorded by high bandwidth, high-speed electronics for x-ray photon counting at a count rate of up to approximately 1 GHz. One or more discriminator levels may be set to exclude interactions (Cherenkov light pulses) representing lower energy x-ray photons arising from large angle target scattering and lower energy Compton interactions.

For example, using Cherenkov radiation, x-ray photons below approximately 320 keV produce no light pulses whatsoever in acrylic plastic. The ultra fast response separates each interaction in time so that the individual pulses may be counted. Cherenkov radiation has a directional dependence on incoming x-ray photons and can further reject off axis radiation from scattering. The total internal reflection and low self absorption properties also allow extremely high aspect ratio converters to be used. Cherenkov converters up to 60 cm in length and as small as 1.0 cm in diameter or equivalent cross sectional dimension, in other words a length to diameter aspect ratio of 60:1, can be operated at high x-ray stopping efficiencies and uniform optical pulse height distributions as seen by the photomultiplier. Conventional scintillating converters have an aspect ratio limit of about 10:1 or less. The detector system of the present invention enhances photon discrimination and reduces the detector susceptibility to low energy and scattered radiation Referring to J. V. Kelly, "Cherenkov Radiation and Its Applications," Pergamon Press, New York (1958) (hereafter "Kelly") and G. F. Knoll, "Radiation Detection and Measurement," John Wiley, Inc., New York (2000), p. 711-713, which are incorporated herein by reference, characteristics of Cherenkov radiation are described as follows. A charged particle moving in a medium where the particle velocity v with respect to the medium exceeds the local speed of light emits Cherenkov radiation at the characteristic angle $$\cos(\theta) = \frac{1}{\beta n},$$

where θ is the angle of emission relative to the particle velocity vector, β=v/c, is the usual relativistic quantity and n is the index of refraction of the medium. For high energy electrons, that is electrons having energies greater than about 2 MeV, β≈1 and the initial emission angle is just given by θ=cos⁻¹(1/n). For an optical plastic such as acrylic (a.k.a. Lucite, Plexiglas, or Perspex) n=1.49 and the Cherenkov angle is 47.8 degrees. This angle results in an internal angle of incidence of the radiation for on-axis particles of 90°−47.8°=42.2°, which is slightly greater than the angle for total internal reflection for acrylic. Hence, as the particle slows down and the Cherenkov angle decreases, virtually all of the radiation will be trapped in the rod converter. A small air gap around the converter, on the order of 0.5 mm or greater ensures optimum internal reflection efficiency. For recoil electron trajectories not quite parallel to the converter axis, 30-60% of the Cherenkov light is lost due to transmission across the optical surface of the converter. This loss fraction increases to near 90% as the recoil electron angle increases beyond 15 degrees to the converter axis. Referring to FIG. 2, this visible and near-UV radiation exits the converter 50 and enters the PMT 55 at the rod end through an index matching optical element 60 which ensures transmission across this interface.

The average pulse current from the PMT given by a particular photon yield can be estimated by using I(amps)=eYDeff ηG/t, where e is the charge of the electron (1.6×10−19 coulomb), Deff is the transport efficiency of Cherenkov light to the PMT photocathode, ηG is the product of the PMT quantum efficiency and gain, and t is the PMT pulse response time. As an example consider Y=200, Deff=0.7, ηG=2×10⁵, and t=1 ns (fast PMT), then I=4.5 mA. This current would produce a signal of 230 mV across an impedance of 50 ohms. By maintaining a fast pulsed detector architecture our individual pulse height signals from the PMT will not require preamplification even down to low energies. Typically only a low gain, a factor of 10 or less, amplifier section is required to match the PMT/converter response and the comparator-discriminator input range.

The number of Cherenkov photons emitted per unit track length per unit frequency interval can be shown to be a constant as described in Kelly on page 22. Accordingly the number of photons per unit wavelength interval is proportional to $1/\lambda^2$ and the radiation is emitted preferentially in the UV and blue regions of the spectrum. Hence the plastic converter 50 is fabricated from ultraviolet transmitting (UVT) acrylic base material known to those skilled in the art. All the surfaces of the rod are highly polished to avoid diffuse scattering of the internally reflected light. Converter rod dimensions found to be effective in research and development tests are one inch diameter by 16 inches in length.

Figure 3:
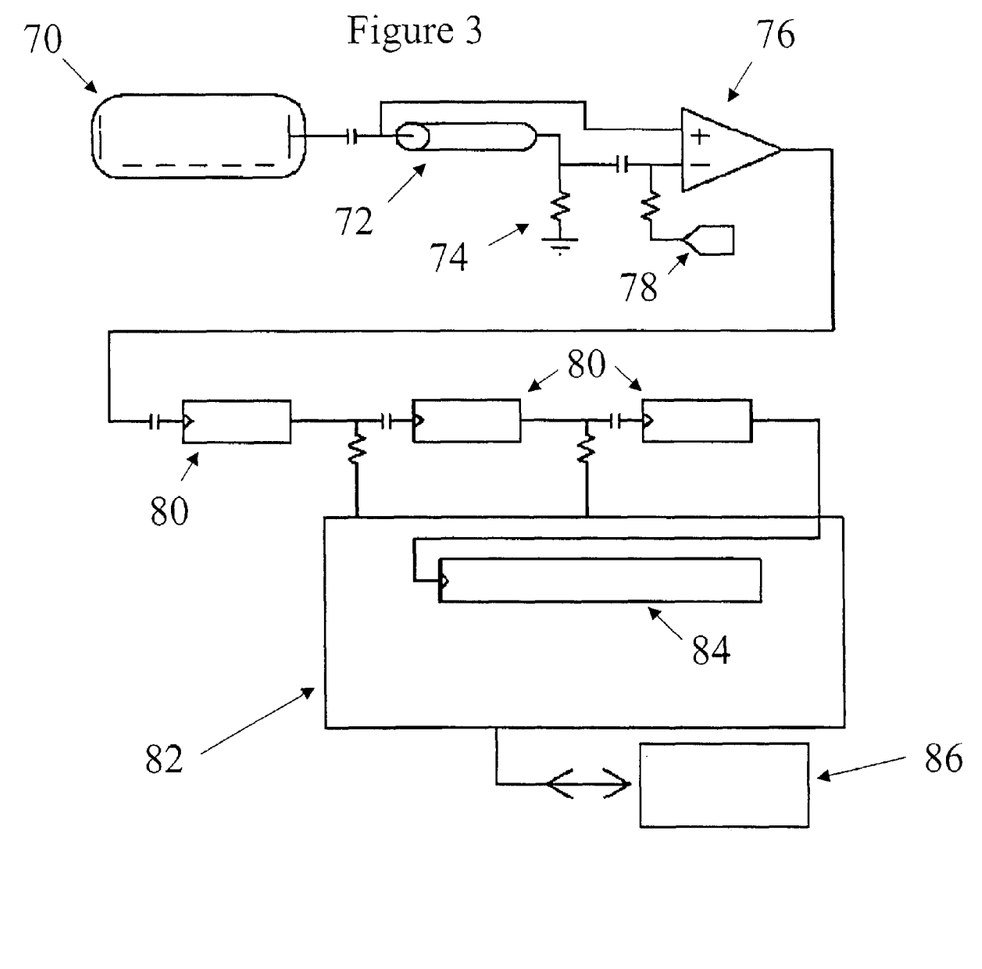
FIG. 3 illustrates an exemplary processing circuit according to an embodiment of the present invention.

As described previously, the imaging system of the second embodiment is capable of counting pulses from the PMTs at an average in-pulse rate of approximately 1 GHz. The post-detection processing circuitry includes high bandwidth, high speed components for discriminating and counting the pulses. For example, referring to FIG. 3, an exemplary post-detection processing circuit includes a PMT 70, e.g., Hamamatsu R4998 one inch diameter tube with a risetime of 700 ps or the like; a 500 ps delay line 72 with 50 ohm termination 74; a comparator 76, e.g., Analog Devices AD53519 dual ultra-fast comparator with bandwidth of 2.5 GHz and an output switching risetime of 150 ps with discriminator 78; high speed ripple counter 80 including, e.g., Micrel, Inc's SY10E137 1.8 GHz integrated 8 bit ripple counter; and microcontroller 82, e.g., Xilinx Spartan III FPGA, with 20-bit counter 84. The circuit output connects to microprocessor 86. This circuit is merely exemplary; one skilled in the art recognizes the alternative components that may be used in such circuits to meet the desired specifications.

As described previously, the second embodiment of the present invention utilizes a dual-energy source to image the contents of a target. This dual energy approach to imaging may be used to differentiate high-Z materials from the low and medium Z surrounding materials, and to a lesser extent, the low and medium Z materials can also be differentiated, but with reduced sensitivity. More specifically, the total attenuation factor of x-rays through matter is given by the well known relation F=exp(μρx), where F is the total attenuation (scattering plus absorption) appropriate for transmission radiography, μ is the mass absorption coefficient in units of cm²/g, ρ is the material density, and x is the thickness normal to a collimated input x-ray beam. Dual energy methods work well for thin materials imaged with photon energies in the 5-150 keV range where the absorption is dominated by the photoelectric effect. Above 1 MeV, low and medium atomic number materials having Z<29 (copper) are dominated by Compton scattering which has a very weak dependence on molecular or nuclear structure.

The vast majority of materials in typical mixed cargoes will have an effective atomic number well below Z=29. Dual-energy imaging using high energy x-rays is at best a marginal discriminator for this class of materials. The situation changes dramatically for high-Z materials, that is materials with atomic numbers greater than about Z=74 (tungsten). Here pair-production in the nuclear electromagnetic field contributes significantly to the mass absorption coefficient. In fact the absorption at 8-10 MeV is greater than at 5-6 MeV, a reversal of the trend for lower Z materials. We note that transition-Z materials in the range Z=29 to Z=81 are rarely seen in large quantities. Lead at Z=82 and bismuth at Z=83 are the only commonly found high-Z elements. Given these facts, dual-energy imaging at several MeV is an excellent discriminator for lead, a common gamma shielding material, and the special nuclear materials uranium (Z=92) and plutonium (Z=94) which will, most likely, in each instance be located together in a single cargo.

Once the high penetration, dual-energy images are created, image processing operations are performed to select and highlight the regions of the images having an effective Z consistent with the presence of high-Z materials or other materials of interest, e.g., explosives. For optimum high-Z material detection a first image processing operation utilizes the fact that regions of the inspection volume having concentrations of high-Z material will exhibit the smallest differentials in brightness levels between the dual-energy images. This will be true regardless of the absolute number of transmitted x-ray photons represented in each image. After narrowing the Z-material candidate areas to these regions, segmentation, contrast leveling, and adaptive filtering algorithms are applied to identify the high-Z areas with confidence levels approaching 99% in the fully penetrated regions. When an object is identified as potentially being high-Z material, an alarm message will be presented to the operator of the imaging system and the suspect areas will be highlighted with, for example, an appropriate pseudo color palette.

More particularly, to detect high-Z materials according the second embodiment of the present invention, the image processing procedure includes three major steps. First, by adjusting the x-ray source, it is possible to make the photon counts approximately equal between the two bands in free air. High-Z materials will be relatively easily detected based on the lower pixel value in the higher energy band. If the target object is a combination of high and low Z materials, the effective Z value and the length of the path through the materials will determine the signature in the two bands. If we loosely define the compound Z value as the combined attenuation effect of the Z values and the thickness of the materials, then the higher the compound Z value is (which means higher effective Z values and/or longer path), the lower the pixel intensity. In addition, due to the exponential attenuation, the higher the compound Z value is, the smaller the difference will exist between the pixel values in the higher energy band and the lower one. In image processing terms, the pixel values in the difference image between the high and low energy band can be used as a relative compound Z value image of the objects being observed.

Next, as mentioned above, the presence of high-Z material will be reflected in the images, depending on the proportion of each type of material, either with the obvious signature of a higher pixel value in the lower energy band, or with a signature similar to those of materials with median Z values, which are usually not transported in massive amount. Therefore, in general, by knowing the x-ray pulse strength and by observing the two-band image signature, part of the pixels in an image can be selected as candidates for high-Z materials.

Finally, the pixels selected in the previous step will form candidate areas in variant shapes and sizes. Based on our assumptions and a priori knowledge of the target object classes, the projection of suspicious high-Z materials have to comply with certain morphological descriptions, which will be defined and utilized to screen the candidate pixels, or the clusters formed by them. And after applying morphological operations, e.g., erosion, dilation, dilation and erosion, higher levels of confidence will be achieved. In addition to these three major steps, other minor steps will be required to complete the procedure, including radiometric correction, noise reduction and image segmentation.

While the processing systems and methods described above are shown implemented through a dual track scanning system, one skilled in the art recognizes that the system may be implemented through a stationary portal or pallet system or alternatively through a mobile, vehicle based system utilizing a boom configuration or gantry-style configuration for placing the source(s) in relation to the detectors. Further, the target may remain stationary, while the source and detector moves or the target may move, while the source and detector remain stationary.

In a third embodiment of the present invention, the dual energy source, i.e., interlaced 4-6 MeV and 8-10 MeV outputs are used in combination with the dual detection mode described with respect to the first embodiment above in order to image the contents of a target. Interlaced dual energy sources are produced by alternatively switching the accelerator electron beam energies between the low and high values. This mode can be implemented in a linac or betatron system, but the most flexible platform is a linac. A linac running at 400 Hz total repetition rate can be made to switch between low and high energy pulses on command. Therefore a pure alternating mode comprised of a 200 Hz low energy pulse train interlaced with a 200 Hz high energy pulse train can be obtained. Other interleave modes are also possible such as three low energy pulses followed by a single high energy pulse. The only limit to the possible permutations of interleave modes is the maximum average operating power of the linac system components. Alternate interleave schemes provide greater flexibility in balancing the low and high energy x-ray powers reaching the detectors. Since each image pixel is composed of 25 or more accelerator x-ray pulses, interlacing has the advantage of providing dual energy mode images, perfectly registered, in a single pass through the or by the scanning system.

In a fourth embodiment of the present invention, the target object is subjected to a follow-up inspection when a high-Z material(s) are preliminarily identified by the methods described above or by an alternative method for high-Z material identification. Once a preliminary identification of the high-Z material(s) has been made, the target object is subjected to a second scan for further analysis of the preliminarily identified material. For this second scan, the dual-energy linac described above is operated in a single mode at 9 MeV or greater. Potentially the end point energy in this scan mode could be as high as 15 MeV if this capability is built into the linac x-ray source. Neutron detectors, such as $^3$He pressurized detectors, bismuth germanate (BGO) scintillators, plastic scintillators, glass fiber scintillators, or any of a number of configurations using $^{10}$B, $^6$Li, $^{157}$Gd, B, BF$_3$, or fission chambers can be used to detect any prompt or delayed fission neutrons resulting from the interrogation. This dual scanning method and system provides positive identification of approximately 10 kg or greater concentrations of special nuclear materials (SNM) such as shielded, highly enriched uranium (HEU) or plutonium with a sensitivity ultimately exceeding 99% and an extremely low order false alarm rate. In addition to these SNM the system can also detect in a similar manner depleted uranium (DU) which is extensively used as a component in nuclear weapon construction.

Unlike previously suggested methods for scanning cargo in the photofission mode the method described here greatly reduces the radiation power and radiation doses required for efficient interrogation. In a method consisting only of a 'blind' photofission scan all the cargo in every vehicle or container must be interrogated at very high energy and x-ray power. These methods cannot take advantage of the knowledge of the contents and nature of the materials in the inspection volume and therefore must operate as if the entire container contained heavily shielded nuclear material.

Figure 4:
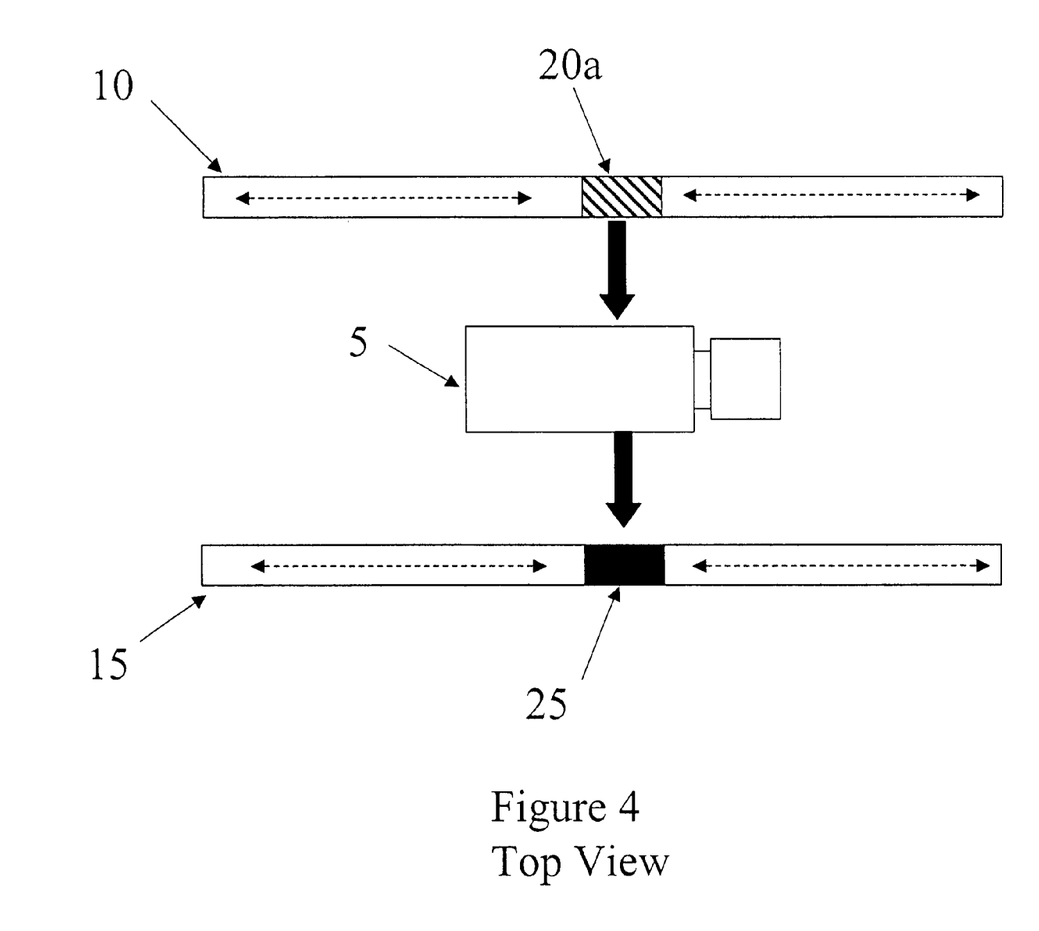
FIG. 4 illustrates an exemplary x-ray and neutron detection system according to an embodiment of the present invention.

In a first specific implementation of the fourth embodiment, the system and method of the second or third embodiments described herein are used to perform an initial scan of a target object. Further, in this first specific implementation, the detector component includes both Cherenkov detectors and $^3$He detectors on the same assembly. Accordingly, referring to FIG. 4 (top-view of the entire system) for the initial scan, the target object 5 remains stationary while the linac source 20a and detector assembly 25 are moved in unison along tracks 10 and 15 to image the target object for, inter alia, regions with an effective atomic number greater than approximately Z=26 in accordance with the description above utilizing the Cherenkov detectors. If a region of the target object 5 having an effective atomic number greater than approximately Z=26 is identified, the linac source 20a and detector assembly 25 perform a second scan of target object 5, utilizing the $^3$He detectors. Because the system requires less critical alignment and has a larger beam angle, a single linac energy source is used having a collimator with a variable slit width for use in both the initial scan and the second interrogation scan. Time needed to open and reset the collimator would be short compared to the scanner or target repositioning time. If the linac source 20a and detector assembly 25 remain stationary according to an alternative embodiment, the target object is moved through a pre-set scanning zone multiple times in order to achieve both the first and second scans. In a particular embodiment, wherein a gantry or "U" shaped carriage is used, neutron and/or Cherenkov detectors may be placed on more than one side of, for example, three-sided carriage, in order to maximize radiation detection.

Figure 5:
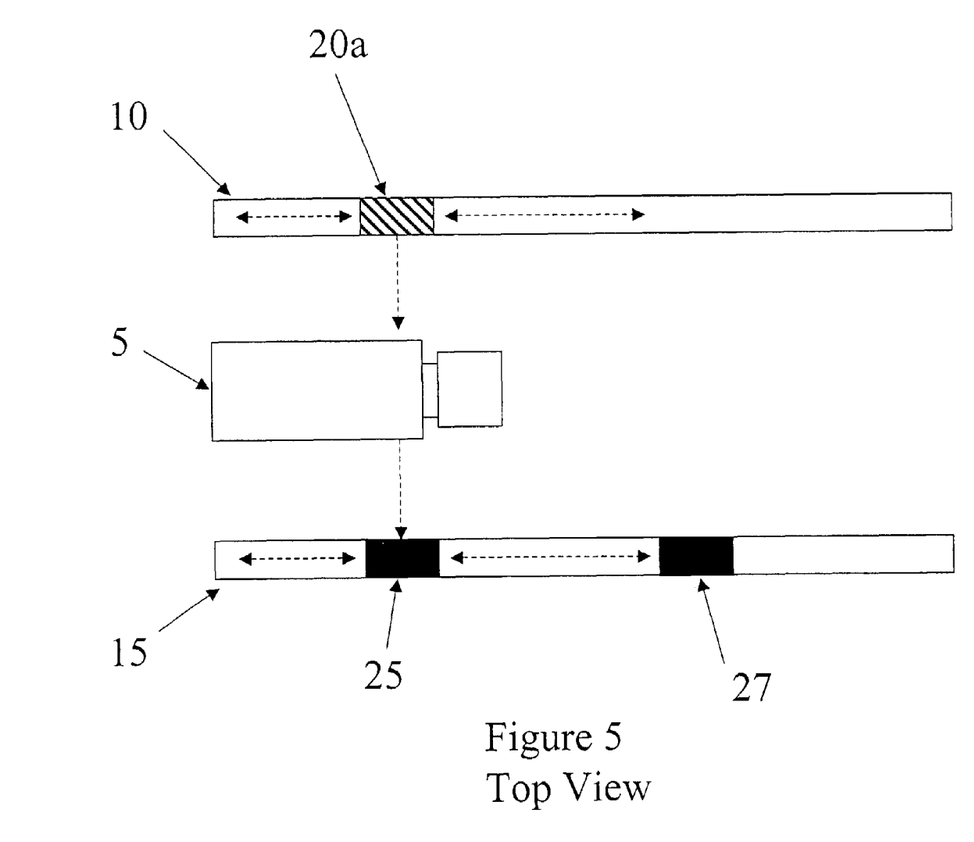
FIG. 5 illustrates an exemplary x-ray and neutron detection system according to an embodiment of the present invention.

Alternatively, in a second specific implementation of the fourth embodiment shown in FIG. 5, after the first scan with the movable linac source 20a and Cherenkov detectors 25 along a stationary target object 5 via tracks 10 and 15, for the second scan, the linac source 20a is moved into alignment with a set of $^3$He detectors 27. In this second specific implementation, the source 20a and the $^3$He detectors 27 remain stationary while the target object is driven through the scanning area.

Further still, in a third specific implementation of the fourth embodiment, the $^3$He detectors are also movable along track 15, accordingly, the target object may always remain stationary.

Figure 6:
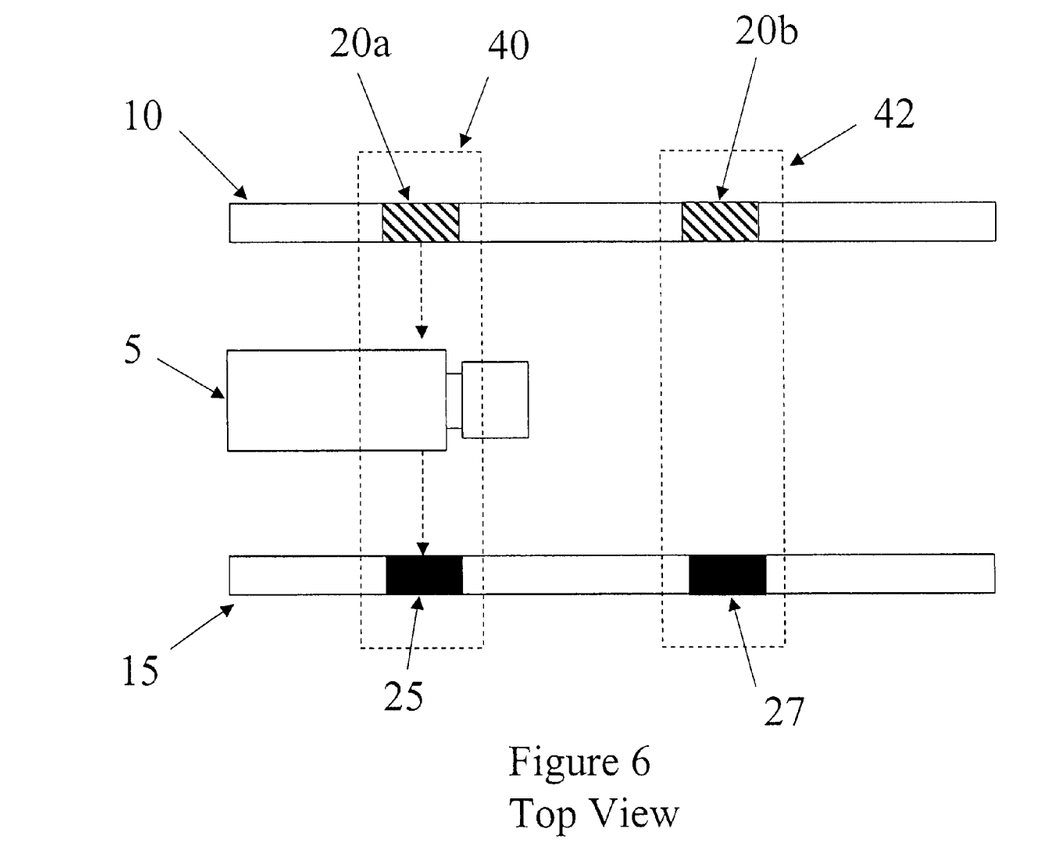
FIG. 6 illustrates an exemplary x-ray and neutron detection system according to an embodiment of the present invention.

In a fourth specific implementation of the fourth embodiment, referring to FIG. 6, there are dual-linac energy sources 20a and 20b, wherein the target object 5 moves through a first stationary scanning zone 40 comprised of a first single or interlaced dual-energy linac energy source 20a and the Cherenkov detectors 25a and then through a second stationary scanning zone 42 comprised of a second single mode linac energy source 20b and the $^3$He detectors 27.

the second scan, the system and method of the fourth embodiment seek to produce prompt and delayed fission neutrons from fissionable material after bombardment by high energy photons. This is the photofission reaction usually written in nuclear physics shorthand as (γ,f) or (γ,fis). Prompt neutrons result directly from the initial fission reaction and are emitted in direct proportion to the x-ray beam power on the target and only while the x-rays are on. Delayed neutrons arise from beta decay of fission products. The decay time of all delayed neutrons is similar over a large range of bremsstrahlung energies. In order to maximize the delayed neutron count rate, the beam-on-target interrogation times are between approximately 10-40 seconds. Additional information related to the existence and timing of delayed neutrons from beta decay of fission products can be found in the following references which are incorporated herein by reference: J. L. Jones, K. J. Haskell, J. M. Hoggan, D. R. Norman, and W. Y. Yoon (INEEL) "Photonuclear based Detection of Nuclear Smuggling in Cargo Containers" 17th Int'l Conf. on Application of Accelerators in Research and Industry, Denton Tex., Nov. 12-16, 2002; C. E. Moss, C. A. Goulding, C. L. Hollas, and W. L. Myers (LANL) "Linear Accelerator-Based Active Interrogation for Detection of Highly Enriched Uranium" 17th Int'l Conf. Application of Accelerators in Research and Industry, Denton, Tex., Nov. 12-16, 2002; Handbook on Nuclear Activation Cross Sections, Tech Reports Series No. 156, IAEA, Vienna, 1974 (p 552); J. C. David et al, "Mass and Charge distributions from Photon-Induced Fission: Comparison with Experimental Data and Yields from Neutron Induced Fission"; and Csaba Sukosd, "Determination of delayed Neutron Parameters and of Uranium Content of a Sample", Dept. of Nuclear Techniques, Budapest Univ. of Technology.

In a preferred implementation of the fourth embodiment, the energy source, e.g., 9 MeV linac, dwells on the suspect region within the target object for approximately 10-20 seconds and then delayed neutron detectors count for approximately 10 seconds after the energy source is shut off. This cycle can be repeated to enhance the signal to noise if a suspicious target were in question.

In a fifth embodiment of the present invention, in addition to the first and second scans of the previous embodiments, the first scan, which may prompt the emission of immediate, i.e., not delayed, neutrons from certain types of SNM, are detected by neutron detectors co-located with the Cherenkov detectors. Prompt fission neutrons produce approximately 100 times the count rate in the neutron detectors as obtained from delayed neutrons. An overall and unique advantage of the invention is the operation of the linac in the high energy mode with little or no detectable neutron contamination as picked up on the neutron detector array. In known high energy systems very large neutron outputs are generated by photo-neutron processes in the high-Z x-ray targets and target shielding at the accelerator. These high-Z materials are essential in achieving the efficiency and shielding necessary to operate at high radiation powers. Such accelerator x-ray photoneutrons overwhelm any neutron detectors designed to observe photofission and make it impossible to see prompt fission neutrons during an x-ray pulse. Hence only delayed fission neutrons are observable in known high energy systems. In the invention described here the high-Z materials are replaced with copper having a photoneutron threshold above 9 MeV. The linac intended to test photofission will be outfitted with this modification. The low radiation power detector technology of the present invention allows a conventional linac to be modified for low photoneutron output without loss of primary imaging performance.

While the processing systems and methods described above are implemented through a dual track system, one skilled in the art recognizes that the system may be implemented through a stationary portal or pallet system or alternatively through a mobile, vehicle based system utilizing a boom configuration or gantry-style configuration for placing the source(s) in relation to the detectors.

The embodiments described above are intended to be exemplary. One skilled in the art recognizes the numerous alternative components and embodiments which may be substituted for the particular examples described herein and still fall within the scope of the invention.

What is claimed is:

1. A system for imaging a target object comprising:
   a source assembly for directing a radiation source at the target object;
   a detector component for detecting a level of radiation passing through the target object;
   the detector component comprising a plurality of converters that convert the radiation into a signal, the detector component comprising:
      a first detector for detecting radiation in an analog mode; and
      a second detector for detecting radiation in a discrete photon counting mode; and
   a processor for imaging the target object in response to the signal from the detector component;
   wherein the processor differentiates between an atomic number by weight of a first material from an atomic number by weight of a second material in the target object;
   wherein the converters comprise Cherenkov x-ray converters.

2. The system of claim 1, wherein the system is selected from the group consisting of relocatable, stationary, pallet, mobile having a boom configuration, and mobile having a gantry configuration.

3. The system of claim 2, wherein the mobile system with gantry configuration comprises a plurality of detectors selected from the group consisting of neutron detectors, Cherenkov detectors, and a combination thereof, wherein the plurality of detectors are located on at least two sides of a three-sided carriage.

4. The system of claim 1, wherein the target object is stationary during imaging.

5. The system of claim 1, wherein the source assembly and the detector component are stationary during imaging of the target object.

6. The system of claim 1, further comprising a first track for guiding the source assembly and a second track for guiding the detector component.

7. The system of claim 1, wherein the detector component comprises a plurality of detector panels and each detector panel comprises a plurality of a first detector or a second detector.

8. The system of claim 7, wherein the detector panels are angled.

9. The system of claim 1, wherein the converters comprise non-scintillating materials.

10. The system of claim 1, wherein a time for directing the radiation source at the target object to detect the level of radiation passing through the target object is less than 60 seconds.

11. The system of claim 1, wherein a rate for directing the radiation source at the target object to detect the level of radiation passing through the target object is approximately 8 to 12 inches per second.

12. The system of claim 1, wherein the source assembly comprises a betatron source or a linear accelerator.

13. The system of claim 12, wherein the betatron source emits at approximately 5.0 to 7.5 MeV.

14. The system of claim 12, wherein the linear accelerator operates in an interlaced mode at approximately 5 to 6 MeV and approximately 8 to 10 MeV end point energies.

15. The system of claim 14, wherein the target object receives at most 20 µSv/hour x-ray exposure or neutron exposure at one meter from one of the plurality of converters.

16. The system of claim 12, further comprising an x-ray collimator.

17. The system of claim 16, wherein the x-ray collimator has a beam fan angle of approximately 26 degrees.

18. The system of claim 16, wherein the x-ray collimator comprises a variable slit width.

19. The system of claim 12, wherein the linear accelerator has an approximately 400 Hz total repetition rate.

20. The system of claim 12, wherein the linear accelerator has a combination of at least one low energy pulse and at least one high energy pulse.

21. The system of claim 1, wherein for a target object less than a predetermined thickness, radiation pulses emitted from the radiated target object are converted to analog photomultiplier tube currents; and for a target object greater than a predetermined thickness, the system performs discrete photon counting.

22. The system of claim 21, wherein the predetermined thickness is 3 inches.

23. The system of claim 1, wherein the processor identifies an atomic number of at least 92.

24. The system of claim 1, wherein the source assembly further comprises a laser alignment system to assist in alignment of the target object with the source assembly.

25. The system of claim 1, further comprising an ion chamber in the path of the radiation to provide substantially real time signals that indicate integrated radiation output for each x-ray pulse.

26. The system of claim 25, wherein each x-ray pulse is approximately 2 to 5 µs in duration.

27. The system of claim 25, wherein the substantially real time signals correct image pixel columns for pulse-to-pulse variations.

28. The system of claim 1, wherein each Cherenkov x-ray converter comprises:
   a non-scintillating plastic or glass rod; and
   a photomultiplier tube.

29. The system of claim 28, wherein the photomultiplier tube has a rise time of approximately 700 picoseconds.

30. The system of claim 28, wherein the interaction of x-rays with the Cherenkov x-ray converter produces Cherenkov radiation including visible light pulses.

31. The system of claim 30, wherein the Cherenkov radiation emits along a Compton recoil electron or positron-electron pair tracks.

32. The system of claim 30, wherein the visible light pulses are less than approximately 300 picoseconds in duration.

33. The system of claim 30, wherein the photomultiplier tube coverts the visible light pulses into current pulses.

34. The system of claim 33, wherein the system uses current pulses for photon counting at a count rate of up to approximately 1 GHz.

35. The system of claim 33, further comprising a processing circuit for discriminating and counting current pulses.

36. The system of claim 35, wherein the processing circuit comprises a comparator, a discriminator, a ripple counter, a microcontroller, a counter, and a microprocessor.

37. The system of claim 36, wherein the comparator has bandwidth of approximately 2.5 GHz and output switching risetime of approximately 150 picoseconds.

38. The system of claim 36, wherein the discriminator excludes visible light pulses.

39. The system of claim 1, wherein the source assembly is configured to operate alternately in a dual energy mode.

40. The system of claim 39, wherein the source assembly provides photon energy at approximately 5 to 150 keV.

41. The system of claim 39, wherein the source assembly provides photon energy at about 1 MeV or greater.

42. The system of claim 39, wherein the source assembly switches the beam energy between at least two values.

43. The system of claim 39, wherein the source assembly provides interlaced outputs of approximately 4 to 6 MeV and approximately 8 to 10 MeV.

44. The system of claim 39, wherein the source assembly has an alternating mode comprised of a 200 Hz low energy pulse train interlaced with a 200 Hz high energy pulse train.

45. The system of claim 1, further comprising a first palette for displaying an image of the target object and a second palette for displaying areas of the target object having an atomic number by weight above a predetermined amount.

46. A method for imaging a target object comprising:
directing radiation from a first radiation source to the target object;
detecting radiation from the irradiated target object at a first detector in analog mode;
directing radiation at the target object after the first detector detects radiation from the irradiated target object;
detecting radiation from the irradiated target object at a second detector in discrete photon counting mode; and
depicting an image of the target object based upon the detected radiation by the first or second detector;
wherein the first detector or second detector comprises a Cherenkov x-ray converter.

47. The method of claim 46, wherein the first and second detectors are a first channel and a second channel, respectively, on a single detector.

48. The method of claim 47, wherein the second detector comprises a plurality of discriminator channels.

49. The method of claim 46, wherein the first radiation source operates in a dual energy mode.

50. The method of claim 49, wherein the first radiation source operates at approximately 4 MeV to 6 MeV in a first mode and approximately 8 to 10 MeV in a second mode.

51. The method of claim 46, wherein a second radiation source directs radiation at the target object after the first detector detects radiation from the irradiated target object.

52. The method of claim 51, wherein the target object is stationary when the second radiation source is directing radiation at the target object.

53. The method of claim 46, wherein the second detector is stationary for the second scan.

54. The method of claim 46, wherein the first radiation source operates at approximately 4 MeV to 6 MeV in a first mode and approximately 8 to 10 MeV in a second mode.

* * * * *